(12) United States Patent
Zhao (10) Patent No.: US 9,005,794 B2
(45) Date of Patent: *Apr. 14, 2015

(54) BATTERY CONNECTOR SYSTEM

(75) Inventor: Weiping Zhao, Superior Township, MI (US)

(73) Assignee: Tyco Electronics Corporation, Berwyn, PA (US)

( * ) Notice: Subject to any disclaimer, the term of this patent is extended or adjusted under 35 U.S.C. 154(b) by 623 days.

This patent is subject to a terminal disclaimer.

(21) Appl. No.: 13/278,775

(22) Filed: Oct. 21, 2011

(65) Prior Publication Data

US 2013/0101883 A1 Apr. 25, 2013

(51) Int. Cl.
*H01M 2/20* (2006.01)
*H01M 2/26* (2006.01)
*H01M 2/30* (2006.01)

(52) U.S. Cl.
CPC ............... *H01M 2/26* (2013.01); *H01M 2/266* (2013.01); *H01M 2/305* (2013.01)

(58) Field of Classification Search
USPC ........................................................ 429/122
See application file for complete search history.

(56) References Cited

U.S. PATENT DOCUMENTS

| | | | |
|---|---|---|---|
| 3,566,190 A * | 2/1971 | Huebner et al. | 361/690 |
| 5,227,267 A | 7/1993 | Goebel et al. | |
| 5,256,502 A | 10/1993 | Kump | |
| 6,409,525 B1 * | 6/2002 | Hoelscher et al. | 439/140 |
| 6,455,190 B1 | 9/2002 | Inoue et al. | |
| 7,504,178 B2 | 3/2009 | Shimamura et al. | |
| 7,794,870 B2 | 9/2010 | Kim et al. | |
| 7,794,875 B2 | 9/2010 | Yoon et al. | |
| 7,927,728 B2 | 4/2011 | Ha et al. | |
| 8,808,031 B2 * | 8/2014 | Zhao | 439/620.27 |
| 2011/0229754 A1 * | 9/2011 | Zhao et al. | 429/158 |
| 2012/0301747 A1 * | 11/2012 | Han et al. | 429/7 |

FOREIGN PATENT DOCUMENTS

EP 1610402 A2 12/2005

OTHER PUBLICATIONS

International Search Report, International Application No. PCT/US2012/060217, International Filing Date, Oct. 15, 2012.

* cited by examiner

*Primary Examiner* — Patrick Ryan
*Assistant Examiner* — Lucas J O'Donnell (57) ABSTRACT

A battery connector system includes a tray assembly configured to be mounted to a battery module made from a plurality of battery cells. The tray assembly includes a tray and a plurality of busbars held by the tray. The tray having a base with channels extending through the base. The channels receive cell tabs from corresponding battery cells. The tray has a tray connector configured to mate with an electrical connector. The busbars are aligned with corresponding channels and configured to be electrically connected to corresponding cell tabs. The busbars are coupled to the tray. The busbars have pins positioned in the tray connector for direct connection with the electrical connector. Optionally, the battery connector system may include a wire harness connector configured to be coupled to the tray connector that includes a housing holding a plurality of terminals being terminated to corresponding wires configured to be routed to a centralized battery management system and the battery connector system may include a circuit board connector configured to be coupled to the tray connector that has a housing holding a circuit board with a plurality of terminals mounted thereto. Either the wire harness connector or the circuit board connector is selectively coupled to the tray connector to define a centralized or decentralized battery management system, respectively.

22 Claims, 10 Drawing Sheets

BATTERY CONNECTOR SYSTEM

BACKGROUND OF THE INVENTION

The subject matter herein relates generally to battery connector systems.

Batteries, such as those for electric vehicles or hybrid vehicles, typically include a plurality of cells grouped together as battery modules. The modules are connected together to form battery packs. Each of the cells include positive and negative tabs that are electrically connected together. Typically, busbars are welded to the cell tabs for sensing the voltage of the cells. A central battery management system is connected to the busbars for sensing and managing the battery cells.

Problems exist with connections between the busbars and other components of the battery management system. For example, typically the systems have many parts and have a complex arrangement of the parts. Some systems have central management while other systems have de-centralized management and the components of the central management system and the de-centralized management system are not interchangeable. Some potential failures are caused by environmental conditions such as moisture, vibration, as well as heating. Alignment of the busbars and the other components of the system is difficult.

A need remains for a battery connector system that connects battery cells and a battery management system in a cost effective and reliable manner.

BRIEF DESCRIPTION OF THE INVENTION

In one embodiment, a battery connector system is provided having a tray assembly configured to be mounted to a battery module made from a plurality of battery cells. The tray assembly includes a tray and a plurality of busbars held by the tray. The tray has a base with channels that extend through the base. The channels receive cell tabs from corresponding battery cells. The tray has a tray connector configured to mate with an electrical connector. The busbars are aligned with corresponding channels and are configured to be electrically connected to corresponding cell tabs. The busbars are coupled to the tray. The busbars have pins positioned in the tray connector for direct connection with the electrical connector. Optionally, the battery connector system may include a wire harness connector configured to be coupled to the tray connector that includes a housing holding a plurality of terminals being terminated to corresponding wires configured to be routed to a centralized battery management system and the battery connector system may include a circuit board connector configured to be coupled to the tray connector that has a housing holding a circuit board with a plurality of terminals mounted thereto. Either the wire harness connector or the circuit board connector is selectively coupled to the tray connector to define a centralized or decentralized battery management system, respectively.

In another embodiment, a battery connector system is provided having a tray assembly configured to be mounted to a battery module made from a plurality of battery cells. The tray assembly includes a tray and a plurality of busbars held by the tray. The tray has a base with channels that extend through the base. The channels receive cell tabs from corresponding battery cells. The tray has a tray connector. The busbars are aligned with corresponding channels and are configured to be electrically connected to corresponding cell tabs. The busbars are coupled to the tray. The busbars have pins positioned in the tray connector. A wire harness connector is configured to be coupled to the tray connector. The wire harness connector has a housing that holds a plurality of terminals. The terminals are terminated to corresponding wires configured to be routed to a centralized battery management system. A circuit board connector is configured to be coupled to the tray connector. The circuit board connector has a housing that holds a circuit board. The circuit board has a plurality of terminals mounted thereto. The wire harness connector and the circuit board connector are selectively coupled to the tray connector to define a centralized or decentralized battery management system, respectively.

In a further embodiment, a battery connector system is provided having a tray assembly configured to be mounted to a battery module made from a plurality of battery cells. The tray assembly includes a tray and a plurality of busbars held by the tray. The busbars are electrically connected to corresponding battery cells. The tray has a tray connector and the busbars have pins positioned in the tray connector. An electrical connector is coupled to the tray connector. The electrical connector has terminals coupled to corresponding pins of the busbars. Each terminal includes a body that has a mating end with beams opposing one another. The mating end has open sides between the beams. The pins are received between the beams and extend through the open sides.

DETAILED DESCRIPTION OF THE INVENTION

Figure 1:
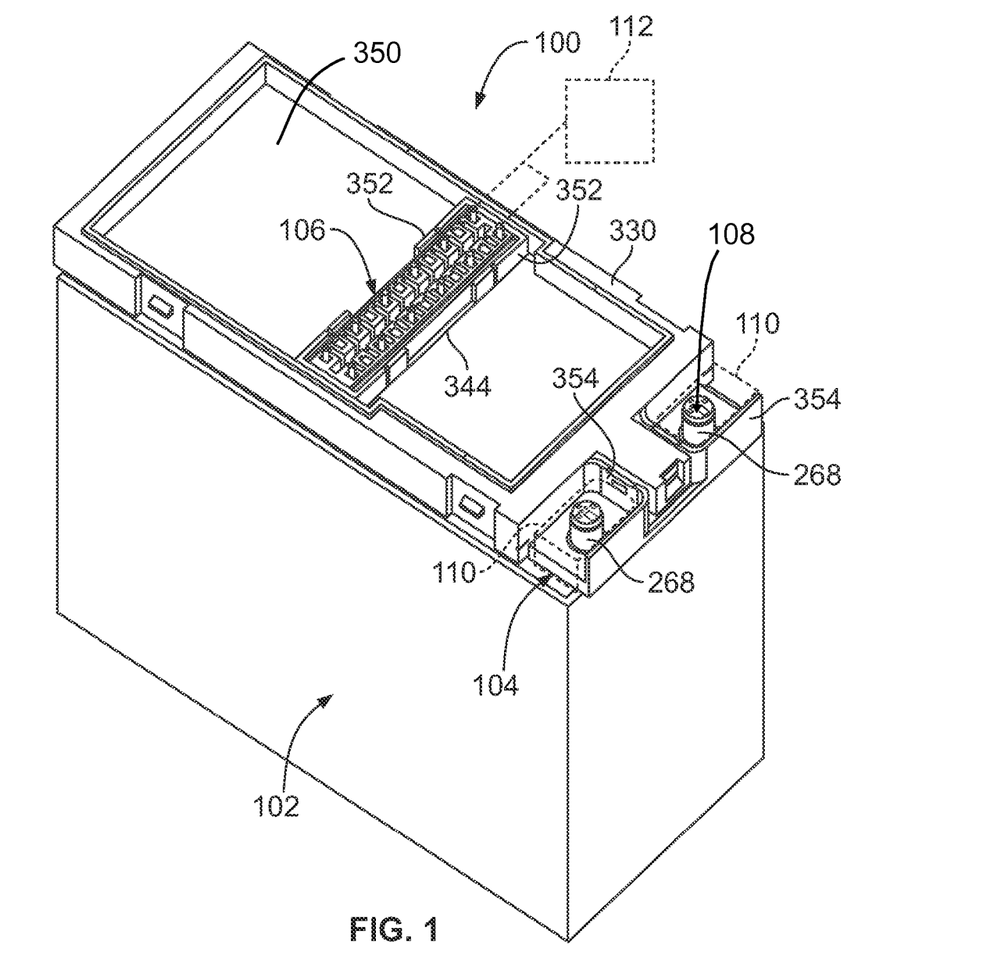
FIG. 1 illustrates a battery connector system formed in accordance with an exemplary embodiment with an electrical connector.

FIG. 1 illustrates a battery connector system 100 formed in accordance with an exemplary embodiment. The battery connector system 100 includes one or more battery modules 102, a tray assembly 104 coupled to each battery module 102 and an electrical connector 106 electrically coupled to each tray assembly 104. The electrical connector 106 is cable mounted and may be referred to hereinafter as a wire harness connector 106.

The battery connector system 100 includes at least one external battery connection 108 configured to be connected to a power connector 110 (represented schematically in FIG. 1). The power connector 110 may be coupled to another battery module or another power source or component within the battery connector system 100.

The electrical connector 106 is connected to a battery management system 112 (represented schematically in FIG. 1) that monitors and/or controls the operation of the components of the battery connector system 100. The electrical connector 106 may be connected to the battery management system 112 by one or more cables each having one or more wires. In an exemplary embodiment, the battery management system 112 is a centralized system that manages the individual battery modules 102 from such central location.

The battery connector system 100 may be used in any application that uses batteries. In an exemplary embodiment, the battery connector system 100 is used in a vehicle, such as an electric vehicle or a hybrid vehicle.

Figure 2:
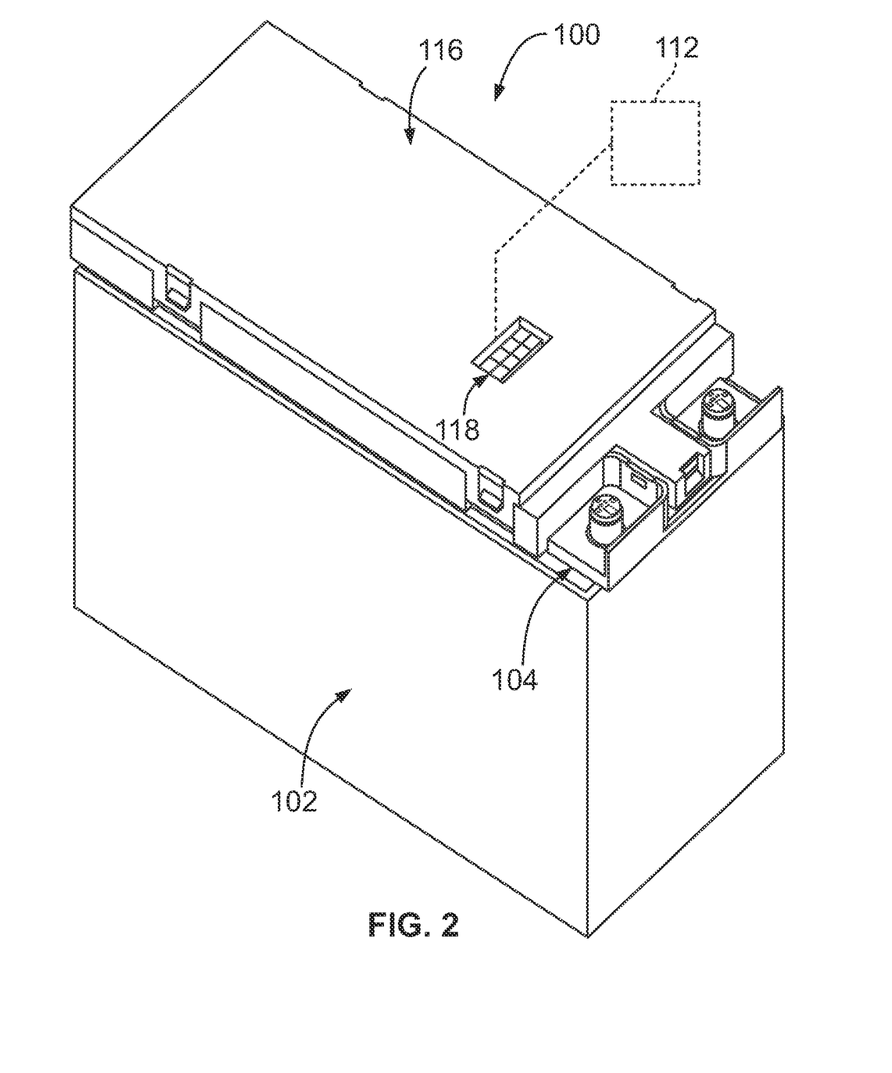
FIG. 2 shows the battery connector system shown in FIG. 1 with another electrical connector.

FIG. 2 shows the battery connector system 100 with another electrical connector 116 coupled to the tray assembly 104. In the illustrated embodiment, the electrical connector 116 is a circuit board connector, as opposed to the wire harness connector 106 (shown in FIG. 1). The electrical connector 116 may be referred hereinafter as a circuit board connector 116. The electrical connector 116 allows for decentralized control by having monitoring and/or control elements built into the electrical connector 116 as opposed to having the monitoring and control functions performed by the battery management system 112. In an exemplary embodiment, the electrical connector 116 may also be connected to the battery management system 112 for overall health monitoring and/or control of the battery connector system 100, while still allowing some monitoring and/or control functions built into the electrical connector 116. For example, a cable mounted plug (not shown) may be coupled to an external connector 118 of the electrical connector 116, and the cable routed to the battery management system 112.

In an exemplary embodiment, both the circuit board connector 116 and the wire harness connector 106 may be coupled to the same tray assembly 104. The tray assembly 104 allows for selective coupling of different types of electrical connectors (e.g., the circuit board connector 116, the wire harness connector 106, or other types of electrical connectors) thereto. The tray assembly 104 allows for interchangeability between systems that use decentralized control with the circuit board connector 116 and systems that use centralized control with the wire harness connector 106. The same components can be used for the battery modules 102 irrespective of using the wire harness connector 106 or the circuit board connector 116. The tooling cost for the battery connector system 100 may be reduced by utilizing the tray assembly 104 to connect with both the wire harness connector 106 and the circuit board connector 116.

The battery connector system 100 may measure the battery health of the battery module 102. The battery connector system 100 may measure the battery status of the battery module 102. The battery connector system 100 may monitor for overvoltage and/or low voltage situation with the battery module 102. The battery connector system 100 may monitor the temperature of the battery module 102. The battery connector system 100 may perform a balancing function for the battery module 102. The battery connector system 100 may manage charging functions of the battery module 102. Such monitoring and/or control functions may be performed by the battery management system 112 and/or the circuit board connector 116.

Figure 3:
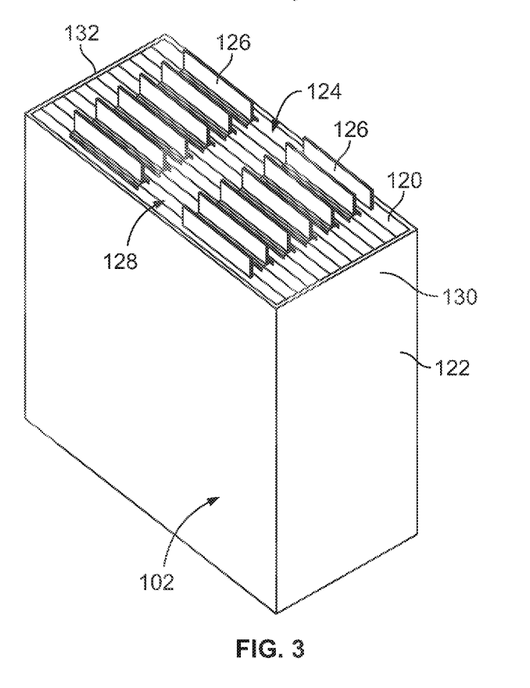
FIG. 3 is an exploded of the battery connector system showing a tray assembly poised for mounting to a battery module of the battery connector system shown in FIGS. 1 and 2.

FIG. 3 is an exploded view of the battery connector system 100 showing the tray assembly 104 poised for mounting to the battery module 102. The battery module 102 includes a plurality of battery cells 120 housed within a container 122. The battery cells 120 may be any type of battery cells. For example, the battery cells 120 may be pouch battery cells or prismatic battery cells. Other types of battery cells may be used in alternative embodiments. Optionally, the battery cells 120 may be narrow plates arranged in a stacked configuration.

Any number of battery cells 120 may be provided in the battery module 102. The battery cells 120 have a top 124. Each battery cell 120 includes two cell tabs 126. The cell tabs 126 extend from the top 124 of the battery cells 120. One cell tab defines a positive tab while the other cell tab 126 defines a negative cell tab. Optionally, the battery cells 120 may be arranged such that the positive cell tabs of adjacent battery cells 120 are adjacent one another and/or engage one another and such that the negative cells tabs of adjacent battery cells are adjacent one another and/or engage one another. In an exemplary embodiment, all battery cell positive and negative tabs are flipped back and forth such that one positive cell tab is aligned with its adjacent negative cell tab. The battery cells are configured as a series circuit. A gap 128 is provided between two groups of cell tabs 126. The first group of cell tabs 126 is provided between the gap 128 and a first side 130 of the battery module 102. The second group of cell tabs 126 is provided between the gap 128 and a second side 132 of the battery module 102.

In the illustrated embodiment, the cell tabs 126 are thin rectangular tabs that extend from the top 124. The cell tabs 126 may have other shapes in alternative embodiments. The cell tabs 126 are planar, however the cell tabs 126 may be nonplanar in alternative embodiments.

The tray assembly 104 is configured to be mounted to the top of the battery module 102. The tray assembly 104 is configured to be mounted over the cell tabs 126. The cell tabs 126 are configured to extend through the tray assembly 104 to be electrically connected to components of the tray assembly 104.

The tray assembly 104 includes a tray 134 and a plurality of busbars 135, 136 held by the tray 134. The busbars 135 represent post busbars having posts defining the external battery connections 108 (shown in FIG. 1), while the busbars 136 represent intermediate busbars positioned between the post busbars.

The tray 134 includes a tray connector 138 configured to mate with the wire harness connector 106 (shown in FIG. 1) or the circuit board connector 116 (shown in FIG. 2). Portions of the busbars 135, 136 are configured to be located in the tray connector 138 for direct electrical connection to the wire harness connector 106 or the circuit board connector 116. Portions of the busbars 135, 136 are positioned exterior of the tray connector 138 and are configured to be electrically connected to corresponding cell tabs 126. For example, the busbars 135, 136 may be welded or jointed to the cell tabs 126. The busbars 135, 136 create a direct electrical path between the battery cells 120 and the wire harness connector 106 or the circuit board connector 116.

Figure 4:
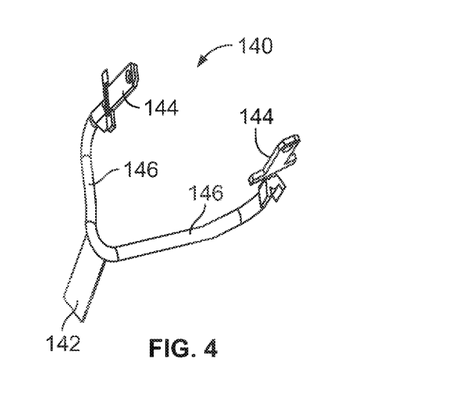
FIG. 4 illustrates a thermistor assembly that is used to monitor a temperature of a battery module for the battery connector system shown in FIGS. 1 and 2.

FIG. 4 illustrates a thermistor assembly 140 that is used to monitor a temperature of the battery module 102 (shown in FIG. 3). The thermistor assembly 140 includes a thermistor sensor 142 that is configured to engage one or more battery cells 120 (shown in FIG. 3) to monitor the temperature of such battery cell(s) 120. The thermistor sensor 142 may span across the tops 124 of multiple battery cells 120. Alternatively, the thermistor sensor 142 may extend between two adjacent battery cells 120. The thermistor sensor 142 may be thin and flexible to allow for easy placement along the corresponding battery cells 120.

The thermistor assembly 140 includes thermistor contacts 144 electrically connected to the thermistor sensor 142. The thermistor contacts 144 are configured to be coupled to the tray assembly 104 for electrical connection to the wire harness connector 106 (shown in FIG. 1) or the circuit board connector 116 (shown in FIG. 2) when such electrical connectors are mated to the tray assembly 104. The thermistor contacts 144 may be of any type and have any shape configured for making an electrical connection with the electrical connectors 106, 116.

In an exemplary embodiment, the thermistor contacts 144 are connected to the thermistor sensor 142 by wires 146 extending therebetween. Alternatively, the thermistor contacts 144 may be coupled to the thermistor sensor 142 by other means, such as a direct electrical connection. Optionally, the thermistor contacts 144 may be integral with the thermistor sensor 142. Any number of thermistor contacts 144 may be connected to the thermistor sensor 142. The thermistor assembly 140 may include any number of thermistor sensors 142.

Figure 5:
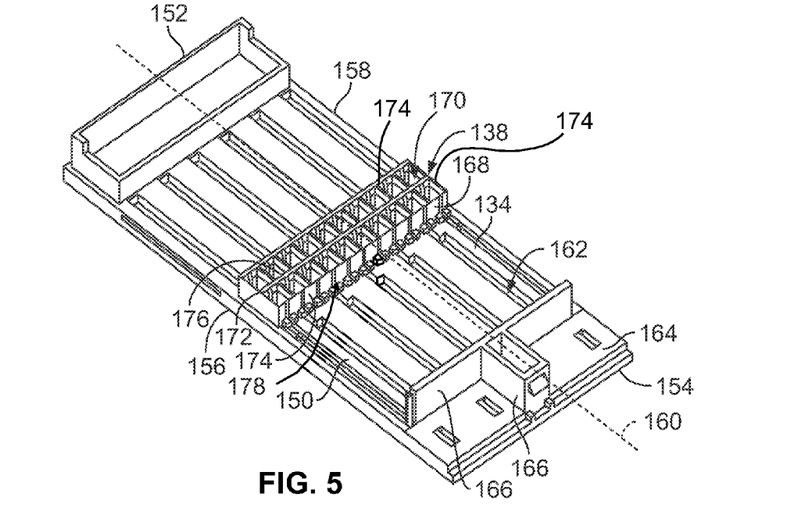
FIG. 5 is a top perspective view of a tray of the tray assembly shown in FIG. 3.

FIG. 5 is a top perspective view of the tray 134 of the tray assembly 104 (shown in FIG. 3). The tray 134 includes a base 150 that extends between first and second sides 152, 154 of the tray 134. The base 150 is manufactured from a dielectric material, such as a plastic material. The base 150 extends between first and second edges 156, 158 of the tray 134. In the illustrated embodiment, the base 150 is generally rectangular in shape, however the base 150 may have other shapes in alternative embodiments. The first and second sides 152, 154 extending generally parallel to one another, however the first and second sides 152, 154 may be non-parallel in alternative embodiments. The first and second edges 156, 158 extend parallel to one another, however the first and second edges 156, 158 may be non-parallel in alternative embodiments.

The base 150 extends along a longitudinal axis 160 that is parallel to the first and second edges 156, 158. In an exemplary embodiment, the tray connector 138 is generally centrally located along the longitudinal axis 160 between the first and second sides 152, 154. Optionally, the tray connector 138 may extend entirely across the base 150 between the first and second edges 156, 158. The tray connector 138 may be positioned along other portions of the base 150 in alternative embodiments.

In an exemplary embodiment, a plurality of channels 162 extend through the base 150. The channels 162 are elongated in the direction of the longitudinal axis 160. The channels 162 extend entirely through the base 150. The channels 162 are configured to receive the cell tabs 126 (shown in FIG. 3) when the tray 134 is mounted to the battery module 102. Optionally, the channels 162 may receive portions of the busbars 135, 136 (shown in FIG. 3). In an exemplary embodiment, the channels 162 are provided on both sides of the tray connector 138, such as between the tray connector 138 and the first side 152 and between the tray connector 138 and the second side 154. The channels 162 are sized and shaped to receive the cell tabs 126 and/or the busbars 135, 136.

The tray 134 has mounting platforms 164 proximate to the second side 154. Optionally, the tray 134 may include mounting platforms 164 proximate to the first side 152 in addition to, or in lieu of, the mounting platforms 164 at the second side 154. The mounting platforms 164 are generally planar. One or more shroud walls 166 extend along the mounting platforms 164. In an exemplary embodiment, one or more shroud walls 166 are provided between the adjacent mounting platforms 164. In the illustrated embodiment, shroud walls 166 are provided between the mounting platforms 164 and the channels 162.

The tray connector 138 includes shroud walls 168 extending upward from the base 150. The shroud walls 168 define a plurality of chambers 170. The chambers 170 have open tops 172 that are configured to receive the wire harness connector 106 or the circuit board connector 116. The shroud walls 168 include both exterior shroud walls 174 and interior shroud walls 176. The interior shroud walls 176 extend between the exterior shroud walls 174. In an exemplary embodiment, each of the chambers 170 is defined by at least one exterior shroud wall 174 and at least one interior shroud wall 176.

In an exemplary embodiment, the chambers 170 are rectangular in cross-section, however the chambers 170 may have different shapes in alternative embodiments. The shroud walls 168 may be tapered at the top 172 to define lead-ins to the chambers 170. In an exemplary embodiment, the chambers 170 are arranged in multiple rows. In the illustrated embodiment, the chambers 170 are arranged in two rows that extend parallel to the first and second sides 152, 154.

The exterior shroud walls 174 include slots 178 therethrough. In an exemplary embodiment, each chamber 170 has a corresponding slot 178 open thereto. The slots 178 are provided in the exterior shroud walls 174 that face the first side 152 and the second side 154. The slots 178 are configured to receive the busbars 135, 136 (shown in FIG. 3) to allow the busbars 135, 136 to be positioned both interior of the tray connector 138 and exterior of the tray connector 138. Optionally, the slots 178 may be aligned with, and open to, corresponding channels 162. The busbars 135, 136 may extend from the channels 162 through the slots 178 into corresponding chambers 170.

Figures 6, 7:
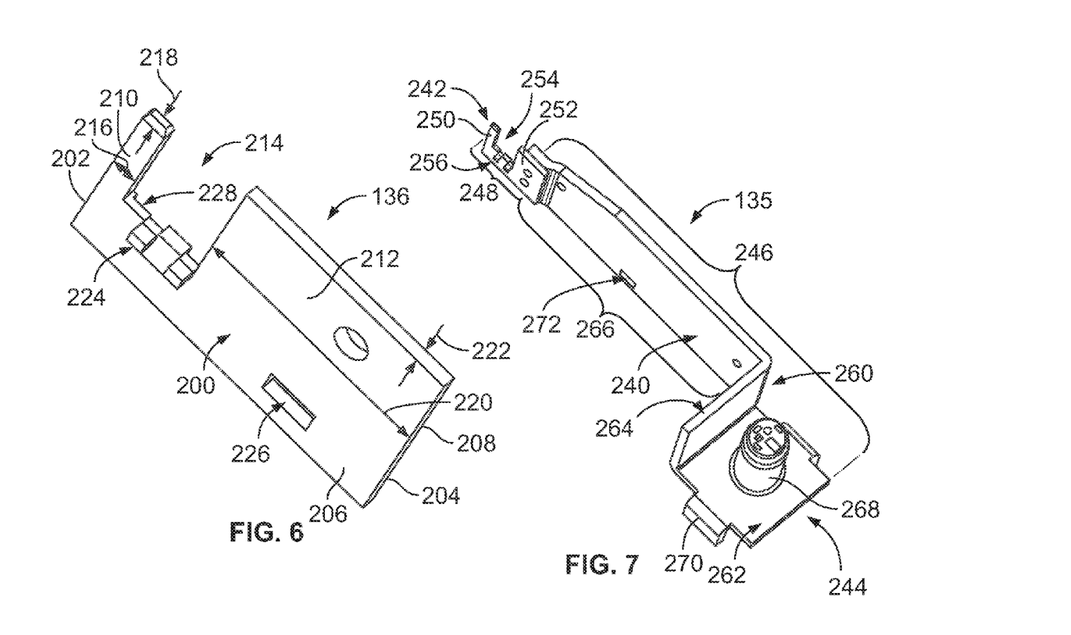
FIG. 6 is a side perspective view of a busbar formed in accordance with an exemplary embodiment.
FIG. 7 is a side perspective view of a busbar formed in accordance with an exemplary embodiment.

FIG. 6 is a side perspective view of the intermediate busbar 136. The busbar 136 includes a main body 200 extending between a first end 202 and a second end 204. The busbar 136 has a first side 206 and a second side 208. Optionally, the first and second sides 206, 208 may be generally planar. The first and second sides 206, 208 may be generally parallel to one another. Optionally, the busbar 136 may be stamped and formed. The busbar 136 includes a pin 210 defined by the main body 200. In the illustrated embodiment, the pin 210 is provided at the first end 202. The pin 210 may be located remote from the first end 202 in alternative embodiments. The busbar 136 includes a plate 212 defined by the main body 200. Optionally, the plate 212 may be provided at the second end 204. An opening 214 separates the pin 210 from the plate 212.

The pin 210 has a rectangular cross-section defined by a width 216 and a thickness 218. The width 216 may be approximate equal to the thickness 218. Optionally, the width 216 may be slightly larger than the thickness 218. The plate 212 has a rectangular cross-section defined by a width 220 and a thickness 222. Optionally, the thickness 222 may be substantially equal to the thickness 218. In an exemplary embodiment, the width 220 is significantly greater than the thickness 222.

The pin 210 is configured to be received in the tray connector 138 (shown in FIG. 5) and is configured to be directly electrically connected to the wire harness connector 106 or the circuit board connector 116 (shown in FIGS. 1 and 2, respectively). The plate 212 is configured to be directly electrically connected to the cell tabs 126 (shown in FIG. 3).

The busbar 136 includes a plurality of pin locating features 224. The locating features 224 are configured to locate the busbar 136 with respect to the tray 134 (shown in FIG. 3). In the illustrated embodiment, one of the pin locating features 224 is an opening through the plate 212. The busbar 136 includes one or more plate locating features 226. The locating features 224, 226 may be used to hold the vertical and/or horizontal position of the busbar 136 with respect to the tray 134.

In an exemplary embodiment, the busbar 136 includes a necked portion 228 proximate to the pin 210. The necked portion 228 is thinner than the pin 210. The necked portion 228 allows the busbar 136, in the area of the necked portion 228, to be more flexible than other portions of the busbar 136. The necked portion 228 allows the pin 210 to move side-to-side, such as to locate the pin 210 for mating with the wire harness connector 106 or the circuit board connector 116.

FIG. 7 is a side perspective view of the post busbar 135. The busbar 135 defines the external battery connection 108 (shown in FIG. 1) for the battery connector system 100. The busbar 135 includes a main body 240 extending between a first end 242 and a second end 244.

Optionally, the main body 240 may be defined by two or more pieces. For example, the main body 240 may be defined by a post section 246 and a pin section 248. The post section 246 is provided at the second end 244. The pin section 248 is provided at the first end 242. The post section 246 defines the external battery connection 108. The pin section 248 defines the mating portion of the busbar 135 with the wire harness connector 106 (shown in FIG. 1) or the circuit board connector 116 (shown in FIG. 2).

The pin section 248 may be coupled to the post section 246, such as by welding the pin section 248 to the post section 246. The pin section 248 may be connected to the post section 246 by other means in alternative embodiments, such as by riveting or staking the pin section 248 to the post section 246.

The pin section 248 includes a pin 250 and a plate 252. An opening 254 is provided between the pin 250 and the plate 252. The pin section 248 may be similar to the busbar 136 (shown in FIG. 6). The pin section 248 includes pin locating features 256 used to locate the busbar 135 with respect to the tray 134 (shown in FIG. 3). In the illustrated embodiment, the pin locating feature 256 includes a pair of tabs extending from the plate 252 with a gap between the pair of tabs. The gap is configured to receive one of the shroud walls 168 (shown in FIG. 5) to locate the busbar 135 with respect to the tray 134.

The post section 246 includes an arm 260 and a mounting base 262 extending from the arm 260. The arm 260 has at least two sections defined by a plate 264 and a connecting wall 266 extending between the plate 264 and the mounting base 262. Optionally, the plate 264 may be generally perpendicular with respect to the connection wall 266. The mounting base 262 may be generally perpendicular with respect to the connecting wall 266. Optionally, the mounting base 262, the plate 264 and the connecting wall 266 may be stamped and formed from a single work piece that is bent between the mounting base 262 and the connecting wall 266 and is bent between the plate 264 and the connecting wall 266. The arm 260 may have other bends or portions in alternative embodiments. The pin section 248 is coupled to the distal end of the arm 260 opposite the mounting base 262. The mounting base 262 is configured to be mounted to the mounting platform 164 (shown in FIG. 5). Optionally, the mounting base 262 may extend generally horizontally.

The mounting base 262 includes a post 268 extending upward therefrom. The post 268 defines the external battery connection 108 for the battery connector system 100. The post 268 is electrically connected to the main body 240 to create an electrical path between the post 268 and the pin 250. The mounting base 262 includes mounting tabs 270 extending therefrom. The mounting tabs 270 are used to secure the mounting base 262 to the mounting platform 164.

The plate 266 defines a surface for welding or otherwise electrically connecting the main body 240 to one of the cell tabs 126 (shown in FIG. 3). The plate 266 has a plate locating feature 272 for locating the busbar 135 with respect to the tray 134. In the illustrated embodiment, the plate locating feature 272 is an opening through the plate 266. Other types of locating features may be used in alternative embodiments.

Figure 8:
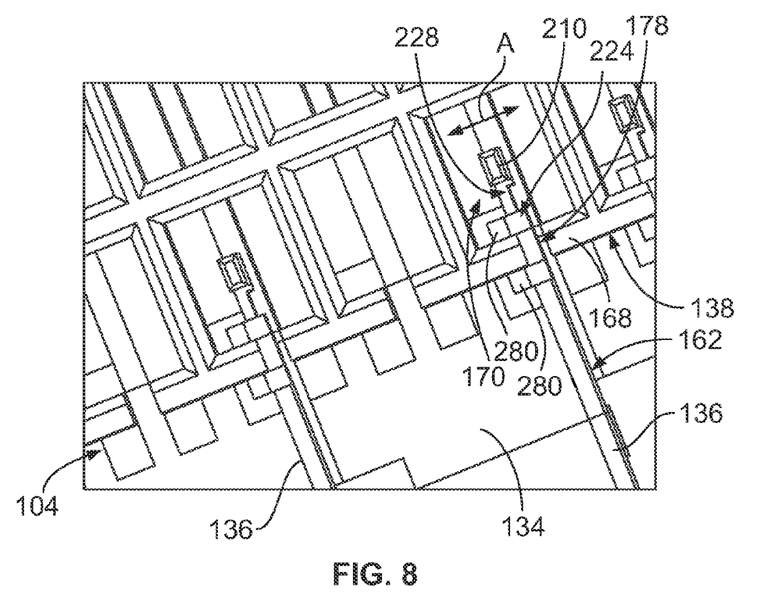
FIG. 8 is a top view of a portion of the tray assembly.

FIG. 8 is a top view of a portion of the tray assembly 104 showing intermediate busbars 136 coupled to the tray 134. The busbars 136 are received in corresponding channels 162. The busbars 136 extend through the shroud walls 168 such that the pins 210 are located in corresponding chambers 170. The pin locating features 224 engage the shroud walls 168 to locate the pins 210 within the chambers 170. In the illustrated embodiment, the pin locating features 224 include a pair of tabs 280. The tabs 280 capture the shroud wall 168 therebetween.

The busbars 136 extend through corresponding slots 178 such that portions of the busbars 136 are located within the chambers 170 and portions of the busbars 136 are located exterior of the tray connector 138. The portions of the busbars 136 exterior of the tray connector 138 are configured to be electrically connected to the cell tabs 126 (shown in FIG. 3).

The necked portion 228 is located next to the pin 210. The necked portion 228 is thinner than the pin 210. The necked portion 228 makes the pin 210 more flexible in the region of the necked portion 228 allowing the pin 210 to flex or move within the chamber 170. For example, the pin 210 may be moved from side-to-side such in the direction of arrow A, to position the pin 210 for mating with the wire harness connector 106 (shown in FIG. 1) or the circuit board connector 116 (shown in FIG. 1).

Figure 9:
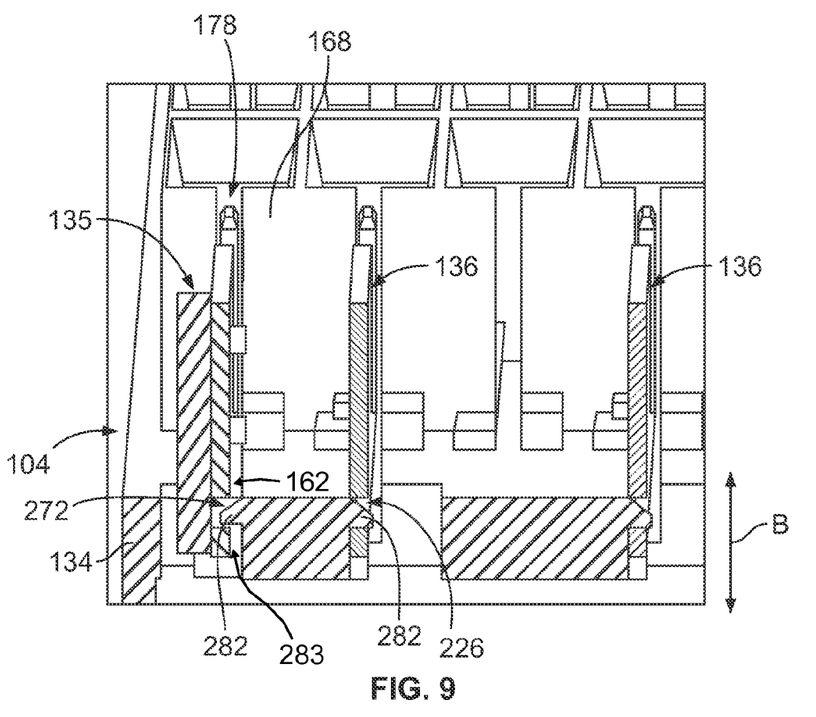
FIG. 9 is a partial sectional view a portion of the tray assembly.

FIG. 9 is a partial sectional view a portion of the tray assembly 104. FIG. 9 illustrates the busbars 135, 136 coupled to the tray 134. Portions of the busbars 135, 136 extend through corresponding slots 178 in the shroud walls 168. The tray 134 includes securing features 282 that interact with the plate locating features 226, 272 to secure the busbars 136, 135, respectively, within the tray 134. The securing features 282 constitute latches or tabs, in the illustrated embodiment, that extend into the openings defining the plate latching features 226, 272. The securing features 282 resist movement of the busbars 135, 136 with respect to the tray 134, such as in the direction of arrow B. In an exemplary embodiment, a gap 283 is provided between the tray channel 162 and the busbar 136 or 135 allowing the busbar 135 or 136 to move horizontally, such that the position of the busbar 135 or 136 is adjustable in the horizontal direction.

Figures 10, 11:
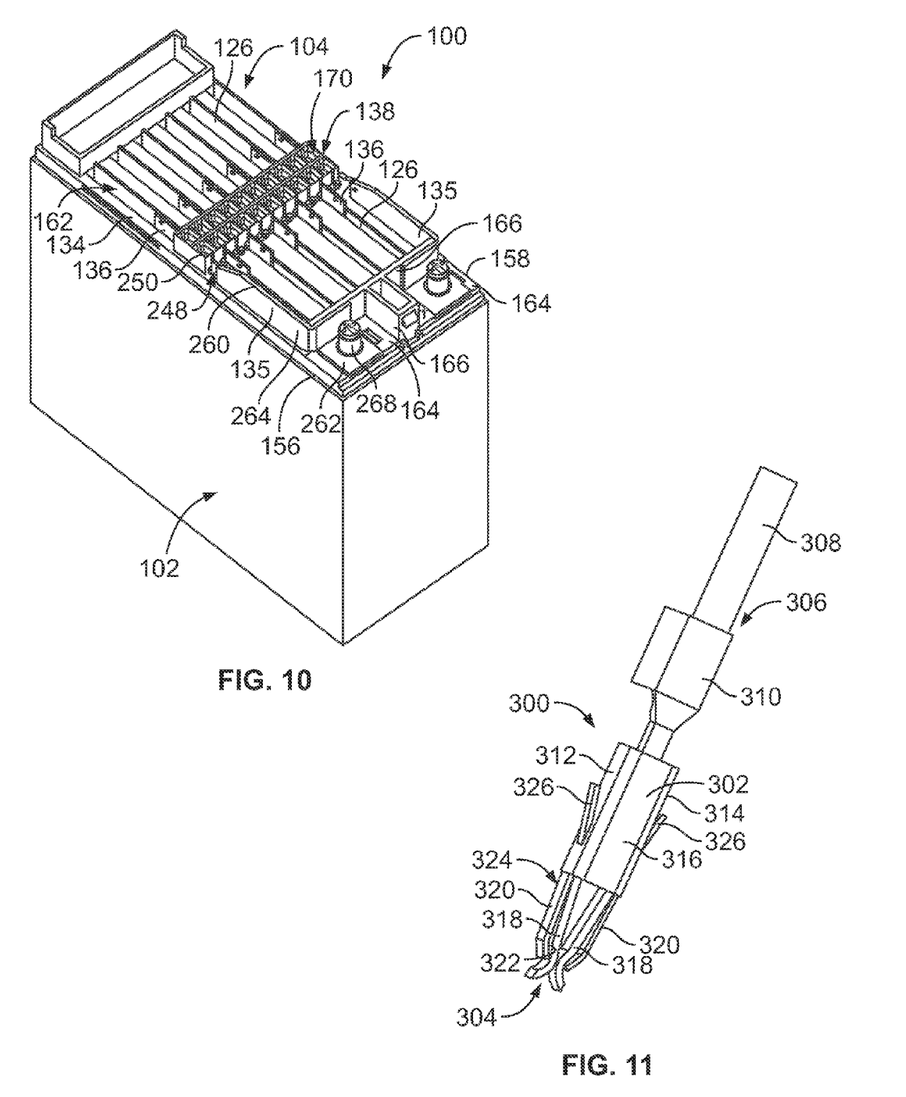
FIG. 10 illustrates the battery connector system showing the tray assembly coupled to the battery module.
FIG. 11 illustrates a terminal for the battery connector system shown in FIG. 1.

FIG. 10 illustrates the battery connector system 100 showing the tray assembly 104 coupled to the battery module 102. Optionally, the busbars 135, 136 are coupled to the tray 134 prior to the tray assembly 104 being coupled to the battery module 102. The busbars 135, 136 may be snapped onto the tray 134, using the locating features 224, 226, 256, 272 (shown in FIGS. 6 and 7). The busbars 135, 136 are located in the channels 162 and held in the tray 134 such that the busbars 135, 136 can be moved slightly relative to the tray 134, such as to adjust the horizontal position of the busbars 135, 136 relative to the tray 134. The tray assembly 104 is coupled to the top of the battery module 102 such that the cell tabs 126 extend through corresponding channels 162. The busbars 135, 136 extend along, and engage, corresponding cell tabs 126. The busbars 135, 136 are electrically connected to corresponding cell tabs 126. For example, the busbars 135, 136 may be welded to the cell tabs 126. Optionally, the busbars 135, 136 may be ultrasonically welded to the cell tabs 126. The busbars 135, 136 may be electrically connected to the cell tabs 126 by other means or processes in alternative embodiments, such as by using a mechanical interference via a deflectable spring beam, by riveting or staking, or by other processes. Having the busbars 135, 136 held and pre-positioned by the tray 134 reduces the effects of vibration of the busbars 135, 136 relative to the cell tabs 126, which can prolong the connection between the busbars 135, 136 and the cell tabs 126.

When the tray assembly 104 is assembled, the busbars 135, 136 are coupled to the tray 134. The post busbars 135 extend along the first and second edges 156, 158 such that the mounting bases 262 are positioned on the mounting platforms 164. The arms 260 extend therefrom towards the tray connector 138. The plate 264 of the arms 260 extend along corresponding cell tabs 126 and such cell tabs 126 are directly electrically connected to the plates 264. The pin sections 248 extend forward from the arms 260 such that the pins 250 are received in corresponding chambers 170. The posts 268 extend above the mounting platforms 164 to define the external battery connections 108 for the battery module 102. In an exemplary embodiment, one of the posts 268 defines a positive battery connection and the other post 268 defines a negative battery connection. The shroud walls 166 extend between the posts 268. The shroud walls 166 also extend between the posts 268 and the cell tabs 126.

FIG. 11 illustrates a terminal 300 for the wire harness connector 106 (shown in FIG. 1). The terminal 300 includes a body 302 having a mating end 304 and a terminating end 306. The mating end 304 is configured to be mated with a corresponding pin 210 or 250 (shown in FIGS. 6 and 7, respectively). The terminating end 306 is configured to be terminated to a wire 308. For example, the terminating end 306 may be crimped to the wire 308. The terminating end 306 may be terminated to the wire 308 by other means or processes in alternative embodiments, such as by soldering, insulation displacement and the like. The terminal 300 includes a crimp barrel 310 at the terminating end 306 for crimping to the wire 308. Optionally, the body 302 may be a two piece body.

The terminal 300 includes end walls 312, 314 with a side wall 316 extending therebetween. Optionally, the terminal 300 may include another side wall opposite the side wall 316. The terminal 300 includes beams 318 extending from the portion of the body having the crimp barrel 310 generally along the end walls 312, 314. The beams 318 have mating interfaces configured to engage the pins 210, 250. The beams 318 oppose one another and are deflectable.

In an exemplary embodiment, the terminal 300 includes stiffeners 320 positioned outside of the beams 318. The stiffeners 320 engage the beams 318 and impart an inward normal force against the beams 318 forcing the beams 318 towards one another. When the pin 210 or 250 is mated with the terminal 300, the stiffeners 320 force the beams 318 against the corresponding pin 210 or 250.

In an exemplary embodiment, the mating end 304 is open-sided having open sides 322, 324 between the beams 318. The open sides 322, 324 allow the pin 210 or 250 to extend outward through the open side 322 and/or 324.

The terminal 300 includes barbs 326 extending from the end walls 312, 314. The barbs 326 are used to retain the terminal 300 in the wire harness connector 106. The barbs 326 are deflectable. Other types of retention features may be used in alternative embodiments to hold the terminal 300 in the wire harness connector 106.

Figures 12, 13, 14:
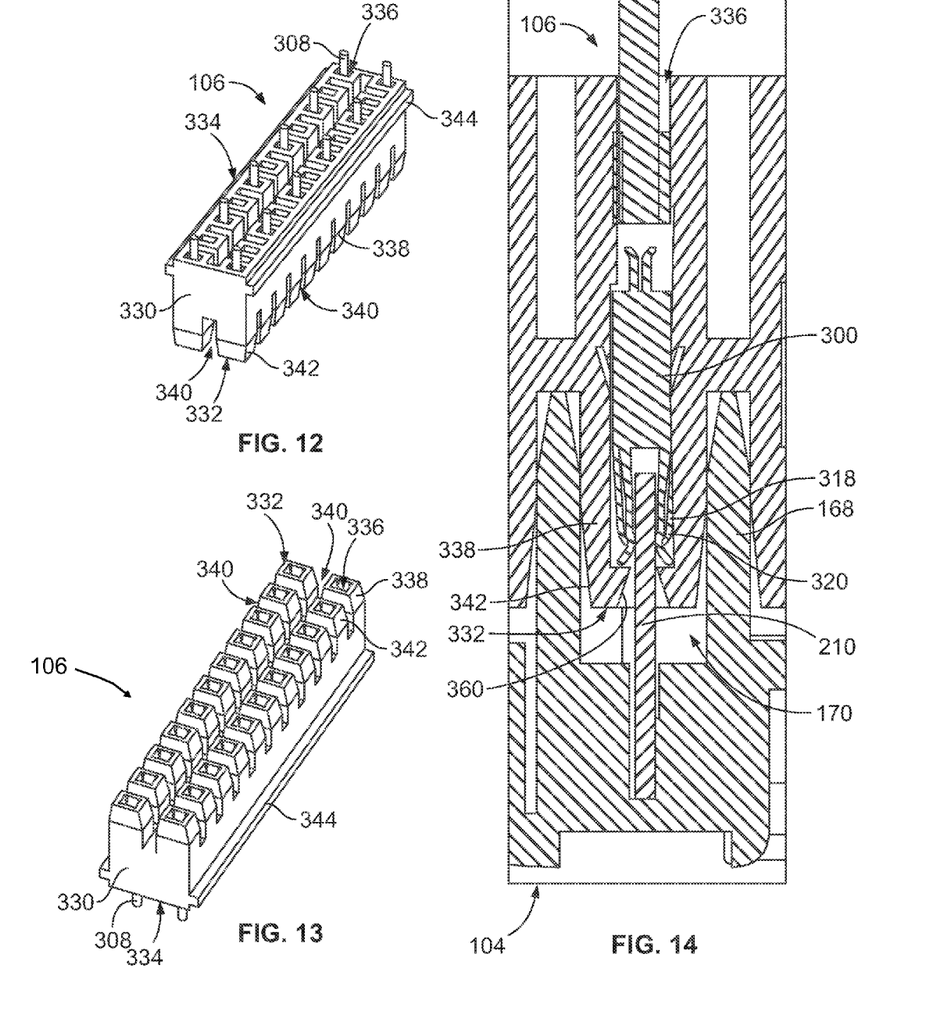
FIG. 12 is a top perspective view of a wire harness connector for the battery connector system shown in FIG. 1.
FIG. 13 is a bottom perspective view of the wire harness connector shown in FIG. 12.
FIG. 14 is a cross-sectional view of the wire harness connector shown in FIG. 12.

FIG. 12 is a top perspective view of the wire harness connector 106. FIG. 13 is a bottom perspective view of the wire harness connector 106. The wire harness connector 106 is configured to be coupled to the tray connector 138 (shown in FIG. 10). The wire harness connector 106 includes a housing 330 extending between a mating end 332 and a wire end 334. The mating end 332 is configured to be mated with the tray connector 138. The wires 308 extend from the wire end 334. The housing 330 has a plurality of openings 336 extending through the housing 330 between the mating end 332 and the wire end 334. The openings 336 receive the terminals 300 (shown in FIG. 11). In an exemplary embodiment, the terminals 300 are loaded into the openings 336 through the wire end 334.

The housing 330 includes a plurality of towers 338. The towers 338 are separated by spaces 340. Each tower 338 has a corresponding opening 336. The terminals 300 are received in corresponding towers 338. The ends of the towers 338 have lead-in surfaces 342 that are angled and that reduce the size of the towers 338 at the ends thereof. The lead-in surfaces 342 guide the towers 338 into corresponding chambers 170 (shown in FIG. 10) of the tray connector 138. The spaces 340 are sized and located to receive corresponding shroud walls 168 (shown in FIG. 10) when the towers 338 are received in the chambers 170. In the illustrated embodiment, the wire harness connector 106 includes two rows of towers 338. Any number of towers 338 may be provided in alternative embodiments. The housing 330 includes lips 344 extending outward therefrom proximate to the wire end 334. The lips 344 are used to secure the wire harness connector 106 to the battery module 102.

Returning to FIG. 1, the battery connector system 100 includes a cover 350 coupled to the battery module 102 and tray assembly 104. The cover 350 extends over the tray assembly 104. The cover 350 includes mounting features 352 used to secure the wire harness connector 106 to the tray assembly 104. In the illustrated embodiment, the mounting features 352 constitute latches that engage the lips 344 on the housing 330. Other types of mounting features may be used in alternative embodiments. The mounting features 352 may include guide walls or other locating features to guide the wire harness connector 106 during mating with the tray assembly 104.

In an exemplary embodiment, the cover 350 includes a post shroud 354 extending around each of the posts 268. The post shrouds 354 block the posts 268 from inadvertent touching. The power connectors 110 fit within the area defined by the post shroud 354 for mounting to the post 268.

FIG. 14 is a cross-sectional view of the wire harness connector 106 coupled to the tray assembly 104. FIG. 14 illustrates the terminal 300 mated with a corresponding pin 210. The interface between the terminal 300 and the pin 210 allows for a direct engagement between the busbar 136 or 135 and the terminal 300 of the wire harness connector 106. The beams 318 engage opposite sides of the pin 210. The stiffeners 320 press the beams 318 against the pin 210. The terminal 300 is illustrated within the opening 336 of one of the towers 338. The tower 338 is loaded into the chamber 170. The shroud walls 168 are received in the spaces 340. The lead-in surfaces 342 of the towers 338, as well as the chamfered ends of the shroud walls 168, help guide the towers 338 into the chamber 170.

The pin 210 is spaced apart from the shroud walls 168 to allow clearance for the terminal 300. The opening 336, at the mating end 332, include guide features 360 that guide the pin 210 into the opening 336. The pin 210 is allowed to move slightly to align with the opening 336. In the illustrated embodiment, the guide features 360 are angled surfaces that guide the pin 210 toward the center of the opening 336 for mating with the terminal 300. Optionally, a moisture seal may be provided at the interface between the wire harness connector 106 and the tray assembly 104.

Figures 15, 16, 17:
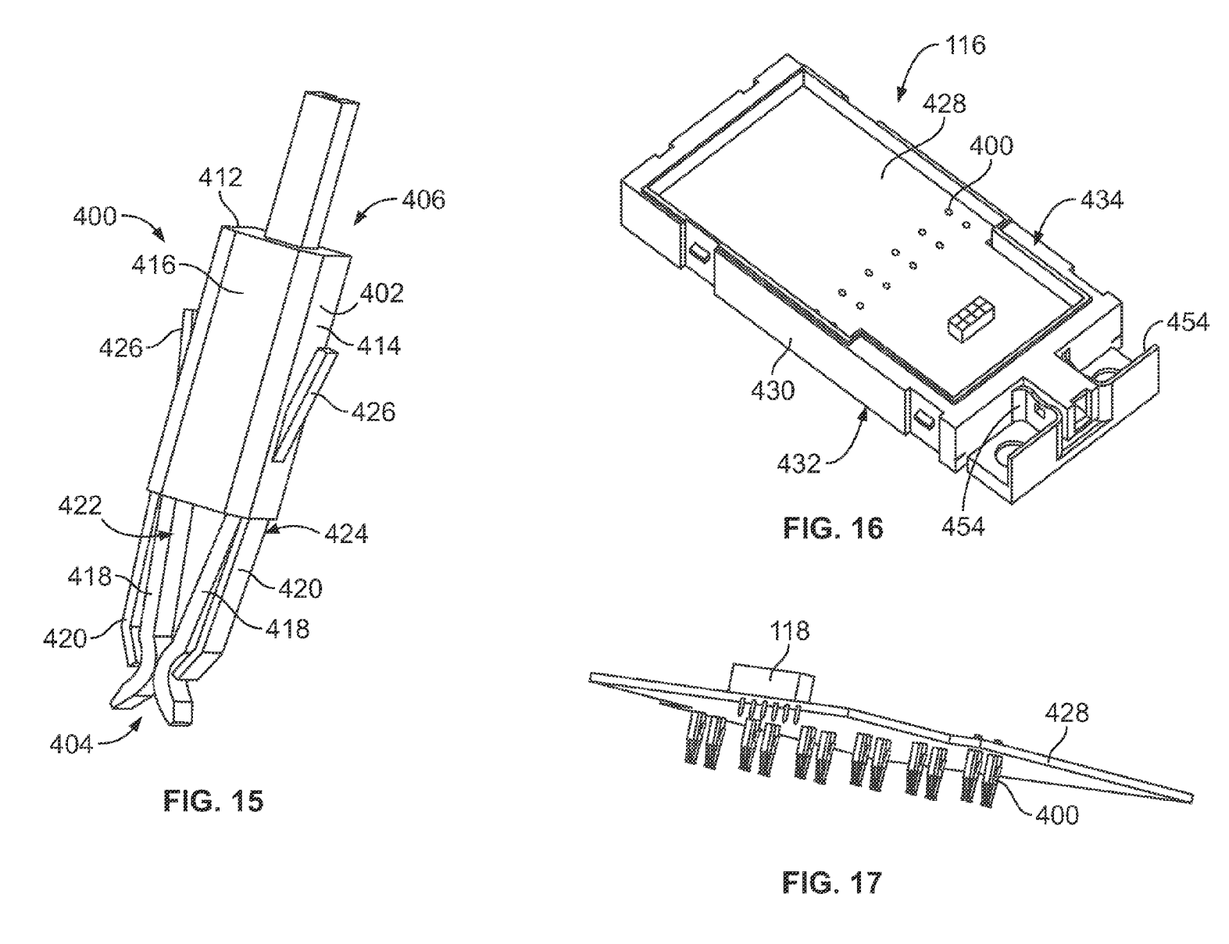
FIG. 15 illustrates a terminal for the circuit board connector for the battery connector system shown in FIG. 2.
FIG. 16 is a top perspective view of a portion of the circuit board connector shown in FIG. 2.
FIG. 17 illustrates a circuit board and terminals for the circuit board connector shown in FIG. 2.

FIG. 15 illustrates a terminal 400 for the circuit board connector 116 (shown in FIG. 2). The terminal 400 may be similar to the terminal 300 (shown in FIG. 11), however the terminal 400 may have a different terminating end 406 than the terminating end 306 (shown in FIG. 11). The terminal 400 is configured to be terminated to a circuit board rather than a wire.

The terminal 400 includes a body 402 having a mating end 404 and a terminating end 406. The mating end 404 is configured to be mated with a corresponding pin 210 or 250 (shown in FIGS. 6 and 7, respectively). The terminating end 406 is configured to be terminated to a circuit board. For example, the terminating end 406 may have a compliant portion that is received in a plated via of a circuit board. In the illustrated embodiment, the terminating end 406 is folded over providing opposed spring arms that may be biased against the plated via of the circuit board to ensure electrical contact therewith. In an alternative embodiment, the terminating end may have a solder tail for soldering to the circuit board. The terminating end 406 may be terminated to the circuit board by other means or processes in alternative embodiments.

The terminal 400 includes end walls 412, 414 with a side wall 416 extending therebetween. Optionally, the terminal 400 may include another side wall opposite the side wall 416. The terminal 400 includes beams 418 extending from the solder tail. The beams 418 are aligned with the end walls 412, 414. The beams 418 have mating interfaces configured to engage the pins 210, 250. The beams 418 oppose one another and are deflectable.

In an exemplary embodiment, the terminal 400 includes stiffeners 420 extending from the end walls 412, 414. The stiffeners 420 are positioned outside of the beams 418. The stiffeners 420 engage the beams 418 and force the beams 418 against the corresponding pin 210 or 250. In an exemplary embodiment, the mating end 404 is open-sided having open sides 422, 424 between the beams 418. The open sides 422, 424 allow the pin 210 or 250 to extend outward through the open side 422 and/or 424.

The terminal 400 includes barbs 426 extending from the end walls 412, 414. The barbs 426 are used to retain the terminal 400 in the circuit board connector 116. The barbs 426 are deflectable. Other types of retention features may be used in alternative embodiments to hold the terminal 400 in the circuit board connector 116.

FIG. 16 is a top perspective view of the circuit board connector 116. The circuit board connector 116 is configured to be coupled to the tray connector 138 (shown in FIG. 10). The circuit board connector 116 may be interchangeable with the wire harness connector 106 and the cover 350 (both shown in FIG. 1).

The circuit board connector 116 includes a circuit board 428 that is received in a housing 430. The housing 430 extends between a mating end 432 and an outer end 434. The mating end 432 is configured to be mated with the tray connector 138. The terminals 400 are coupled to the circuit board 428 and are held by the housing 430. The circuit board 428 is received in the housing 430 through the outer end 434. Optionally, a lid may cover the outer end 434.

The housing 430 is configured to be coupled to the battery module 102 and tray assembly 104, as shown in FIG. 2. The housing 430 extends over the tray assembly 104. In an exemplary embodiment, the housing 430 includes a post shroud 454 extending around each of the posts 268. The post shrouds 454 block the posts 268 from inadvertent touching. The power connectors 110 (shown in FIG. 1) are configured to fit within the area defined by the post shroud 454 for mounting to the post 268.

FIG. 17 illustrates the circuit board 428 and the terminals 400 mounted to the circuit board 428. Various electrical components may be coupled to the circuit board 428 that are used to monitor and/or control the battery module 102 (shown in FIG. 2). Such electrical components may be electrically connected to one or more of the terminals 400. Such electrical components and/or the terminals 400 may be electrically connected to the external connector 118, which is mounted to the circuit board 428.

Figure 18:
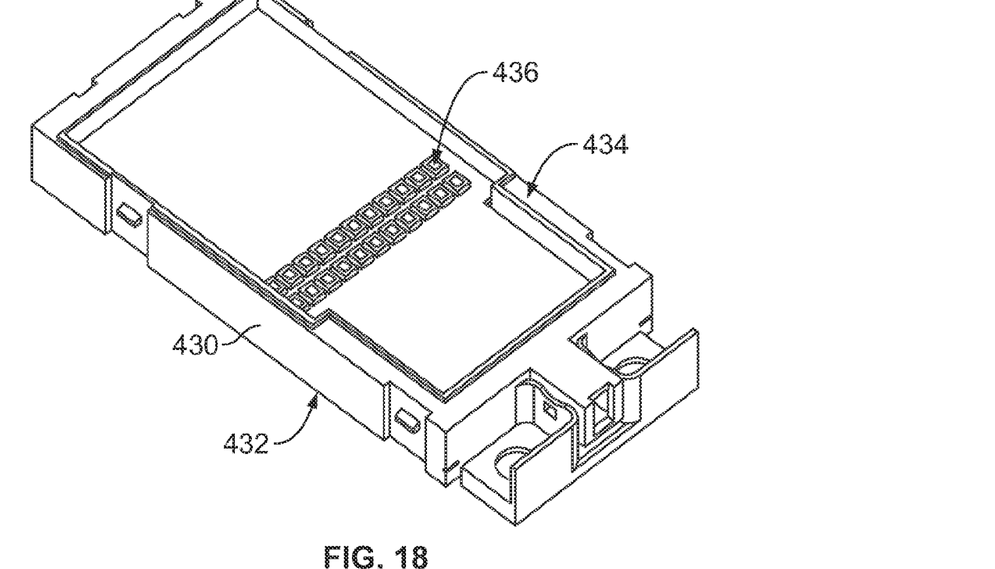
FIG. 18 is a top perspective view of a housing of the circuit board connector shown in FIG. 2.
Figure 19:
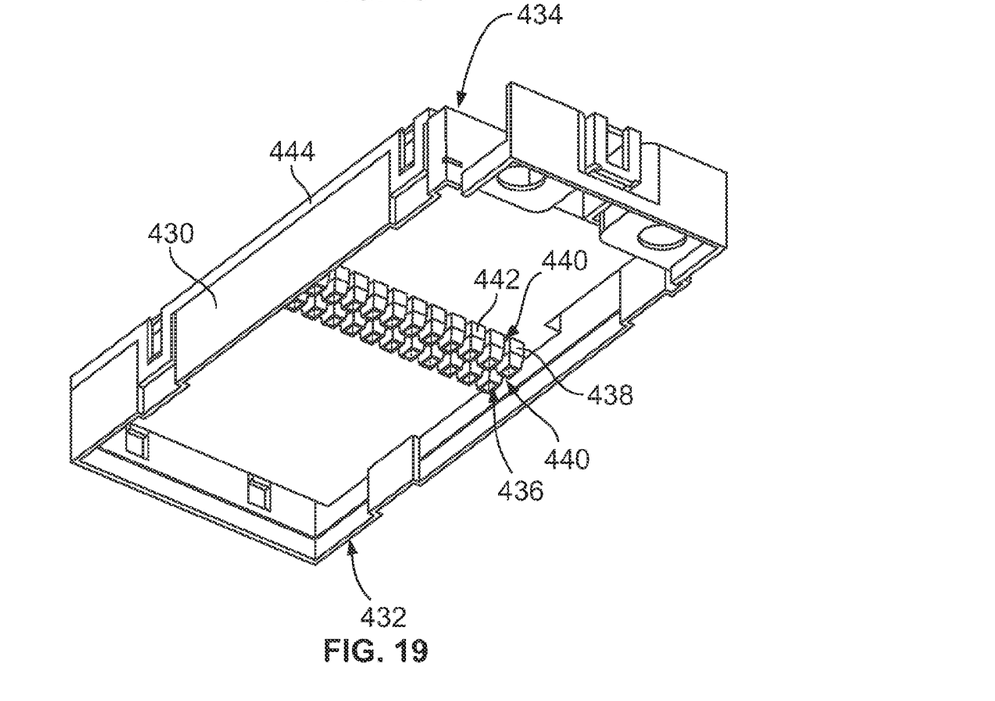
FIG. 19 is a bottom perspective view of the housing shown in FIG. 18.

FIG. 18 is a top perspective view of the housing 430. FIG. 19 is a bottom perspective view of the housing 430. The housing 430 has a plurality of openings 436 extending through the housing 430 between the mating end 432 and the outer end 434. The openings 436 receive the terminals 400 (shown in FIG. 17) when the circuit board 428 (shown in FIG. 17) is loaded into the housing 430.

The housing 430 includes a plurality of towers 438. The towers 438 are separated by spaces 440. Each tower 438 has a corresponding opening 436. The terminals 400 are received in corresponding towers 438. The ends of the towers 438 have lead-in surfaces 442 that are angled and that reduce the size of the towers 438 at the ends thereof. The lead-in surfaces 442 guide the towers 438 into corresponding chambers 170 (shown in FIG. 10) of the tray connector 138. The spaces 440 are sized and located to receive corresponding shroud walls 168 (shown in FIG. 10) when the towers 438 are received in the chambers 170. In the illustrated embodiment, the circuit board connector 116 includes two rows of towers 438. Any number of towers 438 may be provided in alternative embodiments. The size, shape and positioning of the towers 438 is substantially similar to the size, shape and positioning of the tower 338 (shown in FIG. 13) such that the circuit board connector 116 and the wire harness connector 106 may both be interchangeably and selectively coupled to the tray connector 138 (shown in FIG. 3). FIG. 19 illustrates a lid 444 coupled to the housing 430.

Figure 20:
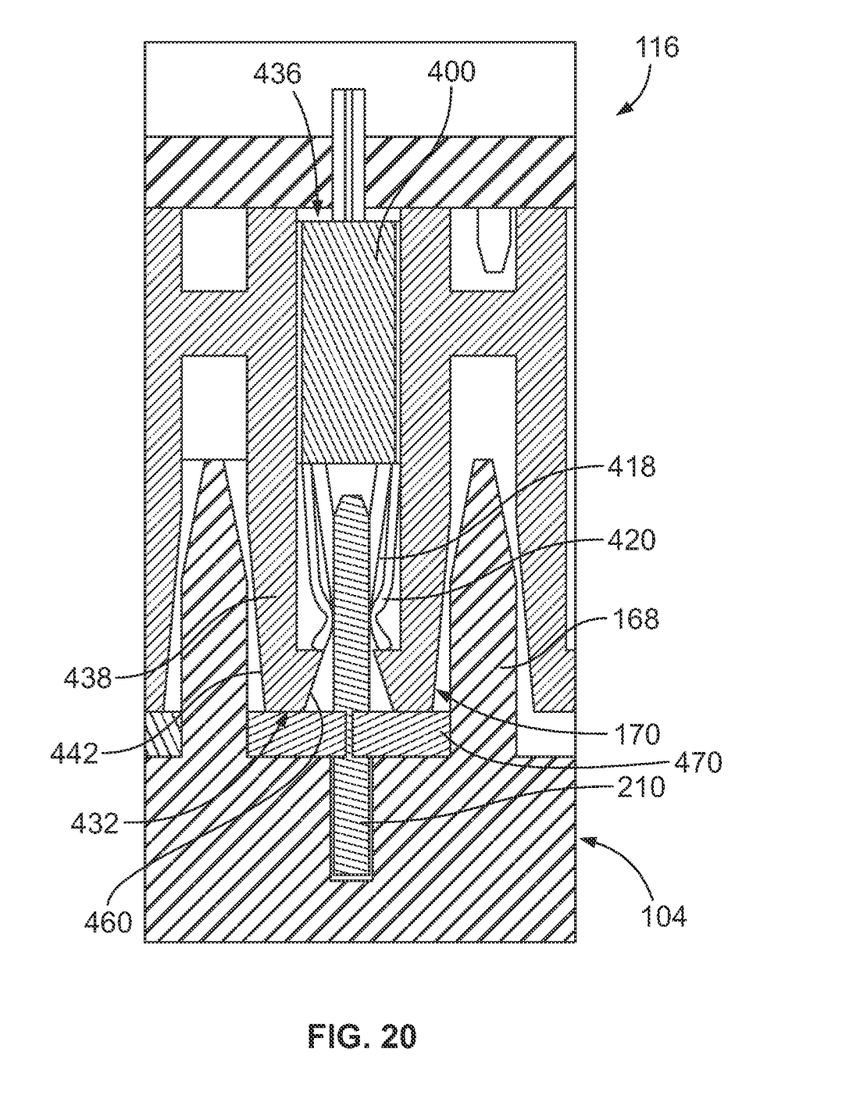
FIG. 20 is a cross-sectional view of the circuit board connector shown in FIG. 2.

FIG. 20 is a cross-sectional view of the circuit board connector 116 coupled to the tray assembly 104. FIG. 20 illustrates one of the terminals 400 mated with a corresponding pin 210. The beams 418 engage opposite sides of the pin 210. The stiffeners 420 press the beams 418 against the pin 210.

The terminal 400 is illustrated within the opening 436 of one of the towers 438. The tower 438 is loaded into the chamber 170. The shroud walls 168 are received in the spaces 440. The lead-in surfaces 442 of the towers 438, as well as the chamfered ends of the shroud walls 168, help guide the towers 438 into the chamber 170. The opening 436, at the mating end 432, include guide features 460 that guide the pin 210 into the opening 436. In the illustrated embodiment, the guide features 460 are angled surfaces that guide the pin 210 toward the center of the opening 436 for mating with the terminal 400.

In an exemplary embodiment, the tray assembly 104 includes a moisture seal 470 at the bottom of the chamber 170. The seal 470 seals the interface between the circuit board connector 116 and the tray assembly 104. The seal 470 may be a gasket, a foam insert, an epoxy filler, or another type of seal. The seal 470 seals around the pin 210. The towers 438 abut against and/or compress the seal 470 to ensure a sealing engagement therewith. The seal 470 provides moisture sealing for the circuit board 428 and corresponding components.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A battery connector system comprising:
    a tray assembly configured to be mounted to a battery module made from a plurality of battery cells, the tray assembly comprising a tray and a plurality of busbars held by the tray such that the tray and busbars are mounted to the battery module together as a unit;
    the tray having a base with channels extending through the base, the channels receiving cell tabs from corresponding battery cells, the tray having a tray connector configured to mate with an electrical connector;
    the busbars being aligned with corresponding channels and configured to be electrically connected to corresponding cell tabs, the busbars being coupled to the tray, the busbars having pins positioned in the tray connector for direct connection with the electrical connector.

2. The battery connector system of claim 1, wherein the busbars include plates, the plates being oriented parallel to the cell tabs and being configured to be directly electrically connected to corresponding cell tabs, the pins extending from the plates and being generally coplanar with the plates, the plates being positioned exterior of the tray connector, the pins being positioned interior of the tray connector.

3. The battery connector system of claim 1, wherein the busbars include plates, the plates being received in the channels, the plates being welded to the cell tabs.

4. The battery connector system of claim 1, wherein the tray connector includes shroud walls defining chambers, the chambers having open tops configured to receive the electrical connector, the shroud walls having slots therethrough, the busbars extending through corresponding slots to position the pins in corresponding chambers.

5. The battery connector system of claim 1, wherein the tray has a first side and a second side, the tray connector being positioned between the first and second sides, the busbars extending from both sides of the tray connector such that some of the busbars are positioned between the tray connector and the first side and some of the busbars are positioned between the tray connector and the second side.

6. The battery connector system of claim 5, wherein the tray connector is approximately centrally located between the first and second sides.

7. The battery connector system of claim 1, wherein the tray has a mounting platform, at least one busbar includes a mounting base seated on the mounting platform, the mounting base having a post extending therefrom defining an external battery connection for the battery connector system.

8. The battery connector system of claim 1, further comprising a thermistor assembly having a thermistor sensor for measuring a temperature of at least one battery cell, the thermistor assembly including a thermistor contact coupled to the thermistor sensor and extending into the tray connector for electrical connection to the electrical connector.

9. The battery connector system of claim 1, wherein the busbars include at least one locating feature for locating the busbar with respect to the tray.

10. The battery connector system of claim 1, further comprising:
    a wire harness connector configured to be coupled to the tray connector, the wire harness connector having a housing holding a plurality of terminals, the terminals being terminated to corresponding wires configured to be routed to a centralized battery management system; and
    a circuit board connector configured to be coupled to the tray connector, the circuit board connector having a housing holding a circuit board, the circuit board having a plurality of terminals mounted thereto;
    wherein either the wire harness connector or the circuit board connector is selectively coupled to the tray connector to define a centralized or decentralized battery management system, respectively.

11. A battery connector system comprising:
    a tray assembly configured to be mounted to a battery module made from a plurality of battery cells, the tray assembly comprising a tray and a plurality of busbars held by the tray such that the tray and busbars are mounted to the battery module together as a unit, the tray having a base with channels extending through the base, the channels receiving cell tabs from corresponding battery cells, the tray having a tray connector, the busbars being aligned with corresponding channels and configured to be electrically connected to corresponding cell tabs, the busbars being coupled to the tray, the busbars having pins positioned in the tray connector;
    a wire harness connector configured to be coupled to the tray connector, the wire harness connector having a housing holding a plurality of terminals, the terminals being terminated to corresponding wires configured to be routed to a centralized battery management system; and
    a circuit board connector configured to be coupled to the tray connector, the circuit board connector having a housing holding a circuit board, the circuit board having a plurality of terminals mounted thereto;

wherein either the wire harness connector or the circuit board connector is selectively coupled to the tray connector to define a centralized or decentralized battery management system, respectively.

12. The battery connector system of claim 11, wherein the busbars include plates, the plates being configured to be directly electrically connected to corresponding cell tabs, the pins extending from the plates, the plates being positioned exterior of the tray connector, the pins being positioned interior of the tray connector.

13. The battery connector system of claim 11, wherein the busbars include plates, the plates being received in the channels, the plates being welded or jointed to the cell tabs.

14. The battery connector system of claim 11, wherein the tray connector includes shroud walls defining chambers, the chambers having open tops configured to receive the wire harness connector or the circuit board connector, the shroud walls having slots therethrough, the busbars extending through corresponding slots to position the pins in corresponding chambers.

15. The battery connector system of claim 11, wherein the tray has a first side and a second side, the tray connector being positioned between the first and second sides, the busbars extending from both sides of the tray connector such that some of the busbars are positioned between the tray connector and the first side and some of the busbars are positioned between the tray connector and the second side.

16. The battery connector system of claim 15, wherein the tray connector is approximately centrally located between the first and second sides.

17. The battery connector system of claim 11, wherein the tray has a mounting platform, at least one busbar includes a mounting base seated on the mounting platform, the mounting base having a post extending therefrom defining an external battery connection for the battery connector system.

18. The battery connector system of claim 11, wherein the busbars include at least one locating feature for locating the busbar with respect to the tray.

19. A battery connector system comprising:

a tray assembly configured to be mounted to a battery module made from a plurality of battery cells, the tray assembly comprising a tray and a plurality of busbars held by the tray such that the tray and busbars are mounted to the battery module together as a unit, the busbars being electrically connected to corresponding battery cells, the tray having a tray connector and the busbars having pins positioned in the tray connector; and an electrical connector coupled to the tray connector, the electrical connector having terminals coupled to corresponding pins of the busbars, each terminal comprises a body having a mating end with deflectable beams opposing one another, the mating end having open sides between the beams, the pins being received between the beams to resiliently deflect the beams and extending through the open sides.

20. The battery connector system of claim 19, wherein the beams engage opposite sides of the corresponding pins, the pins extending from the terminals through at least one of the open sides thereof.

21. The battery connector system of claim 19, wherein the busbars include plates, the plates being configured to be directly electrically connected to corresponding cell tabs, the pins extending from the plates, the plates being positioned exterior of the tray connector, the pins being positioned interior of the tray connector.

22. The battery connector system of claim 19, wherein the electrical connector comprises at least one of a wire harness connector or a circuit board connector, the wire harness connector having a housing holding the terminals, the terminals being terminated to corresponding wires configured to be routed to a centralized battery management system, and the circuit board connector has a housing holding a circuit board, the terminals being mounted to the circuit board, wherein either the wire harness connector or the circuit board connector is selectively coupled to the tray connector to define a centralized or decentralized battery management system, respectively.

* * * * *